W. S. Blake,
Steam-Boiler Indicator.
N° 16,173.   Patented Dec. 9, 1856.
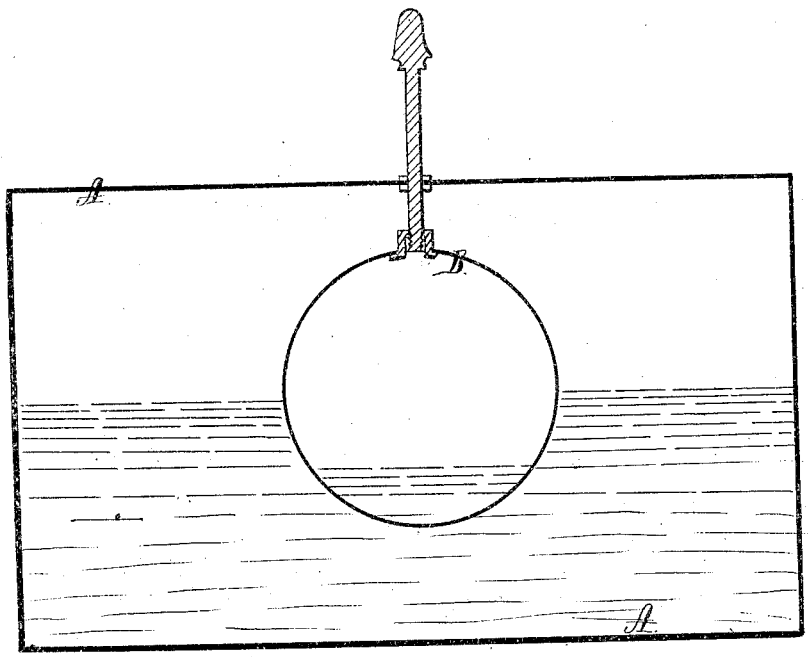

UNITED STATES PATENT OFFICE.

WILLIAM S. BLAKE, OF BOSTON, MASSACHUSETTS.

FLOAT FOR STEAM-BOILERS.

Specification of Letters Patent No. 16,173, dated December 9, 1856.

*To all whom it may concern:*

Be it known that I, WILLIAM S. BLAKE, of Boston, in the county of Suffolk and State of Massachusetts, have invented an Improvement in Floats or Gages for Steam-Boilers; and I do hereby declare that the same is fully described and represented in the following specification and the accompanying drawing, which represents a sectional view of a steam-boiler with a float applied thereto to operate on the principle of my invention.

In this drawing, A, exhibits the boiler, which may be constructed air tight like boilers in common use for generating steam at high pressure; B, is the gage float, which is a hollow air tight sphere (or vessel of any other suitable form) and having a small quantity of liquid or water placed within it, such float being a smaller boiler or steam generator. The float is so made in order to overcome the effect of external pressure of steam, which were the float empty would be liable to cause it to collapse, particularly were such float constructed of any other form than that of a sphere. The amount of water to be placed in the float may be very small and so as not to very materially affect the buoyant properties of the float.

When the water in the boiler is heated so as to make steam, that within the float will be correspondingly raised in temperature and vaporized so that the pressure within the float will be nearly if not exactly sufficient to balance that of the steam on its external surface. Consequently, it will be perceived that a float may be made very light, or of little weight or thickness when constructed to operate as described. It also may be made of any desirable form without danger of being collapsed.

I am aware, that within a boiler, a hollow sphere filled with compressed air, has been used as a steam gage float, the air therein, previously having been compressed so as to enable it to counterbalance or counteract the pressure of the steam on the exterior surface of the float during the use of such float in a boiler. This kind of float involves the necessity of its being made very strong, or enough so to resist the pressure of air within it, when no pressure of steam is exerted on the outer surface. The principle of operation of this compressed air float differs essentially from that of my improved float, as this latter is a small steam generator, placed within a boiler, and having its internal pressure produced and regulated by the heat of the contents of the boiler, and only when such contents are in a heated state, whereas with the compressed air float, the internal pressure is always in action, and is the least contracted when there is no steam in the boiler. From this it will be seen, that with my invention a float can be made with much less thickness of metal in comparison to what would be required were it constructed to hold compressed air. The pressure inside of my float, under all circumstances, is equal or nearly so to that on its outside, however great may be or whatever may be the pressure of the steam in the boiler, as the heat of the contents of such boiler will vaporize the water in the generator float, and maintain the vapor in such float to a degree of tension or pressure corresponding with that of such contents of the boiler.

I do not claim the principle of a steam gage hollow ball, float or sphere made air tight and filled with compressed air or gas forced into it by external pressure, before such float is used or placed within the boiler; nor do I claim a hollow air tight box or globe partly filled with water or a liquid and separate from and without reference to the above mentioned application and connection of it with a boiler so as to be operated by it in manner described, but What I do claim as my invention is—

The specified application of a steam gage vapor generative float (constructed substantially as explained) with a closed steam boiler and so as to have its contents vaporized by the heat of those in the boiler in manner and for the purpose of resisting their pressure exerted externally on the float as set forth, the boiler thus serving, by the heat of its contents, to produce the agent by which the pressure of the steam on the external surface of the float is neutralized.

In testimony whereof, I have hereunto set my signature this 26th day of September A. D. 1856.

W. S. BLAKE.

Witnesses:
R. H. EDDY,
F. P. HALE, Jr.